US012614077B2

(12) United States Patent
Ye et al.

(10) Patent No.: US 12,614,077 B2
(45) Date of Patent: Apr. 28, 2026

(54) METHOD OF PROCESSING MULTIMODAL TASKS, AND AN APPARATUS FOR THE SAME

(71) Applicant: SAMSUNG ELECTRONICS CO., LTD., Suwon-si (KR)

(72) Inventors: Ning Ye, Toronto (CA); Zhiming Hu, Maple (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 746 days.

(21) Appl. No.: 17/981,024

(22) Filed: Nov. 4, 2022

(65) Prior Publication Data

US 2023/0259779 A1 Aug. 17, 2023

Related U.S. Application Data

(60) Provisional application No. 63/310,496, filed on Feb. 15, 2022.

(51) Int. Cl.
G06N 3/08 (2023.01)
G06F 16/738 (2019.01)
(Continued)

(52) U.S. Cl.
CPC ........... G06N 3/084 (2013.01); G06F 16/738 (2019.01); G06N 3/044 (2023.01); G06N 3/063 (2013.01)

(58) Field of Classification Search
CPC .................................................. G06N 3/084
See application file for complete search history.

(56) References Cited

U.S. PATENT DOCUMENTS 10,839,223 B1 * 11/2020 Jiang ....................... G06V 20/46
11,074,454 B1 7/2021 Vijayanarasimhan et al.
(Continued)

FOREIGN PATENT DOCUMENTS

WO 2021/028656 A1 2/2021

OTHER PUBLICATIONS

International Search Report (PCT/ISA/210) and Written Opinion (PCT/ISA/237) issued by the International Searching Authority on May 19, 2023 in corresponding International Application No. PCT/KR2023/001876.
(Continued)

*Primary Examiner* — Mohammad S Rostami
(74) *Attorney, Agent, or Firm* — Sughrue Mion, PLLC

(57) ABSTRACT
An electronic device may obtain a query from a user input; obtain a sequence of frames of one or more input videos; select frames from the sequence of frames of the one or more input videos, via a sampler neural network configured to extract features from the sequence of frames that are input to the sampler neural network, determine temporal dependencies between the extracted features, and determine an action of selecting or skipping for each of the sequence of frames; and identify a video that matches the query via a multimodal neural network configured to receive the selected frames and the query, and output the video that matches the query, among the one or more input videos, wherein the sampler neural network and the multimodal neural network are jointly trained based on an aggregated loss that combines an accuracy loss that represents an accuracy of determining the video that matches the query, and an efficiency loss that reflects a proportion of frames being passed to the multimodal neural network.

18 Claims, 14 Drawing Sheets

(51) Int. Cl.
    *G06N 3/044*         (2023.01)
    *G06N 3/063*         (2023.01)
    *G06N 3/084*         (2023.01)

(56)               References Cited

U.S. PATENT DOCUMENTS

| | | | |
|---|---|---|---|
| 11,151,191 B2 | 10/2021 | Hsieh et al. | |
| 11,238,093 B2* | 2/2022 | Ayush | G06F 16/783 |
| 11,693,902 B2* | 7/2023 | Chechik | G06N 20/00 |
| | | | 707/705 |
| 2017/0357720 A1 | 12/2017 | Torabi et al. | |
| 2019/0251112 A1* | 8/2019 | Stojancic | G06F 16/41 |
| 2020/0183977 A1 | 6/2020 | Soni et al. | |
| 2020/0327702 A1 | 10/2020 | Wang et al. | |
| 2021/0150249 A1 | 5/2021 | Zheng et al. | |
| 2021/0365727 A1 | 11/2021 | Aggarwal et al. | |
| 2022/0147565 A1 | 5/2022 | Chalasani et al. | |
| 2022/0256175 A1* | 8/2022 | Jain | G06N 3/045 |
| 2023/0113643 A1* | 4/2023 | Mittal | G06F 16/75 |
| | | | 382/159 |

OTHER PUBLICATIONS

Communication issued on Dec. 2, 2024 from the European Patent
Office for European Patent Application No. 23756565.0.

* cited by examiner

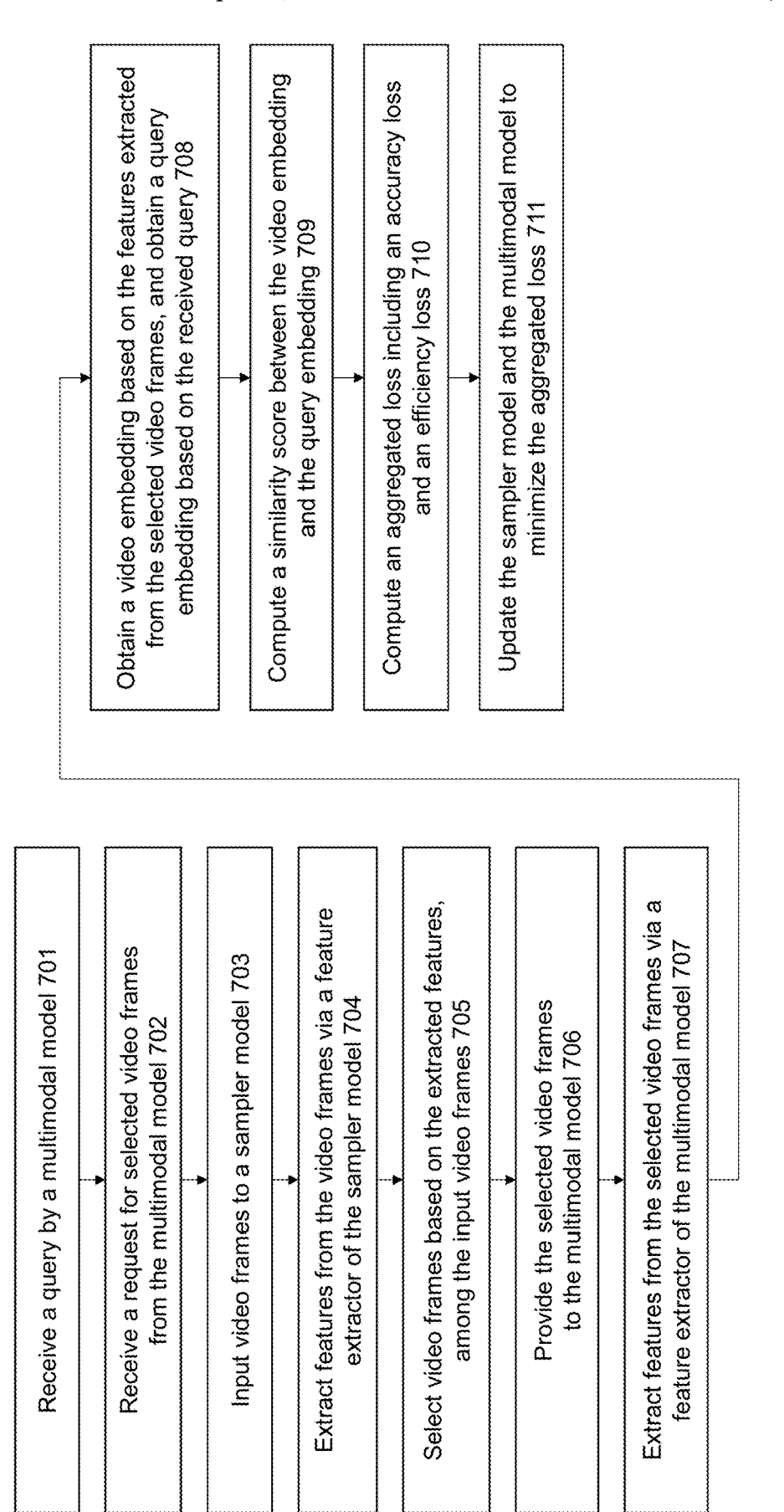

FIG. 7

Receive a query by a multimodal model 701

Receive a request for selected video frames from the multimodal model 702

Input video frames to a sampler model 703

Extract features from the video frames via a feature extractor of the sampler model 704

Select video frames based on the extracted features, among the input video frames 705

Provide the selected video frames to the multimodal model 706

Extract features from the selected video frames via a feature extractor of the multimodal model 707

Obtain a video embedding based on the features extracted from the selected video frames, and obtain a query embedding based on the received query 708

Compute a similarity score between the video embedding and the query embedding 709

Compute an aggregated loss including an accuracy loss and an efficiency loss 710

Update the sampler model and the multimodal model to minimize the aggregated loss 711

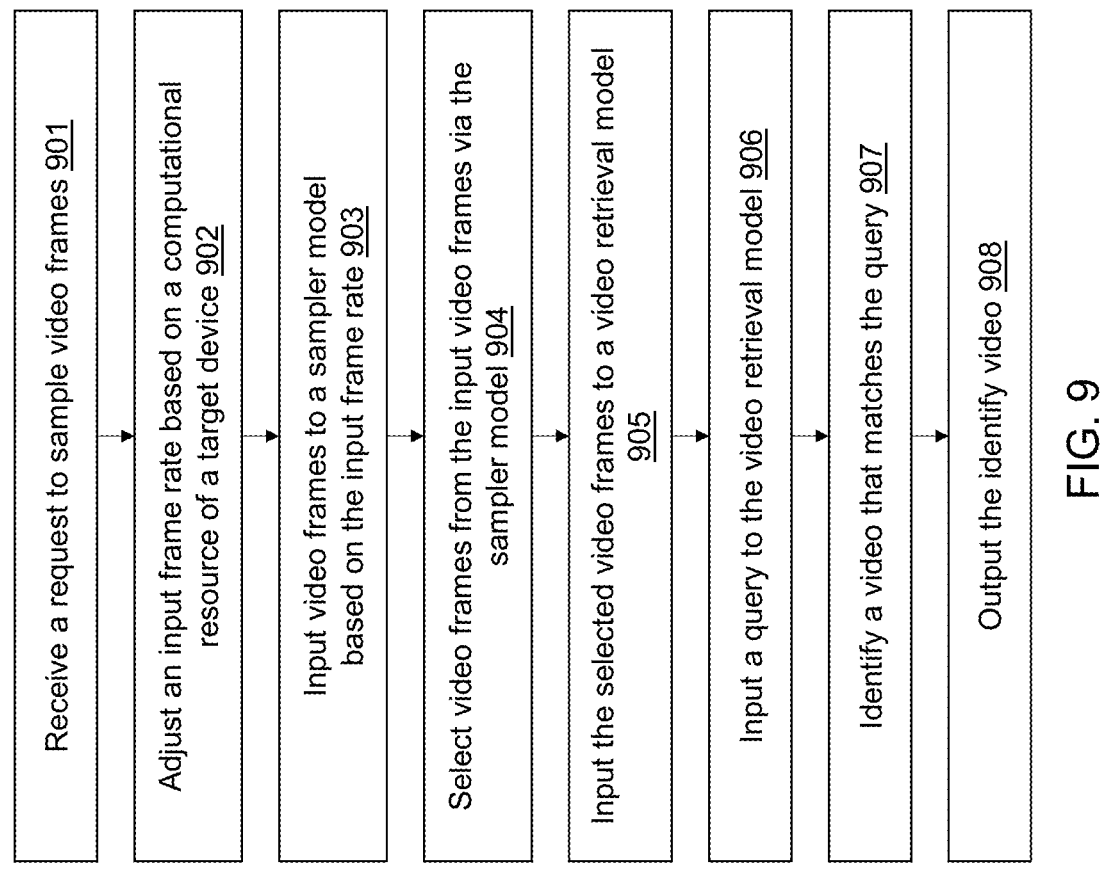

Receive a request to sample video frames 901

Adjust an input frame rate based on a computational resource of a target device 902

Input video frames to a sampler model based on the input frame rate 903

Select video frames from the input video frames via the sampler model 904

Input the selected video frames to a video retrieval model 905

Input a query to the video retrieval model 906

Identify a video that matches the query 907

Output the identify video 908

FIG. 9

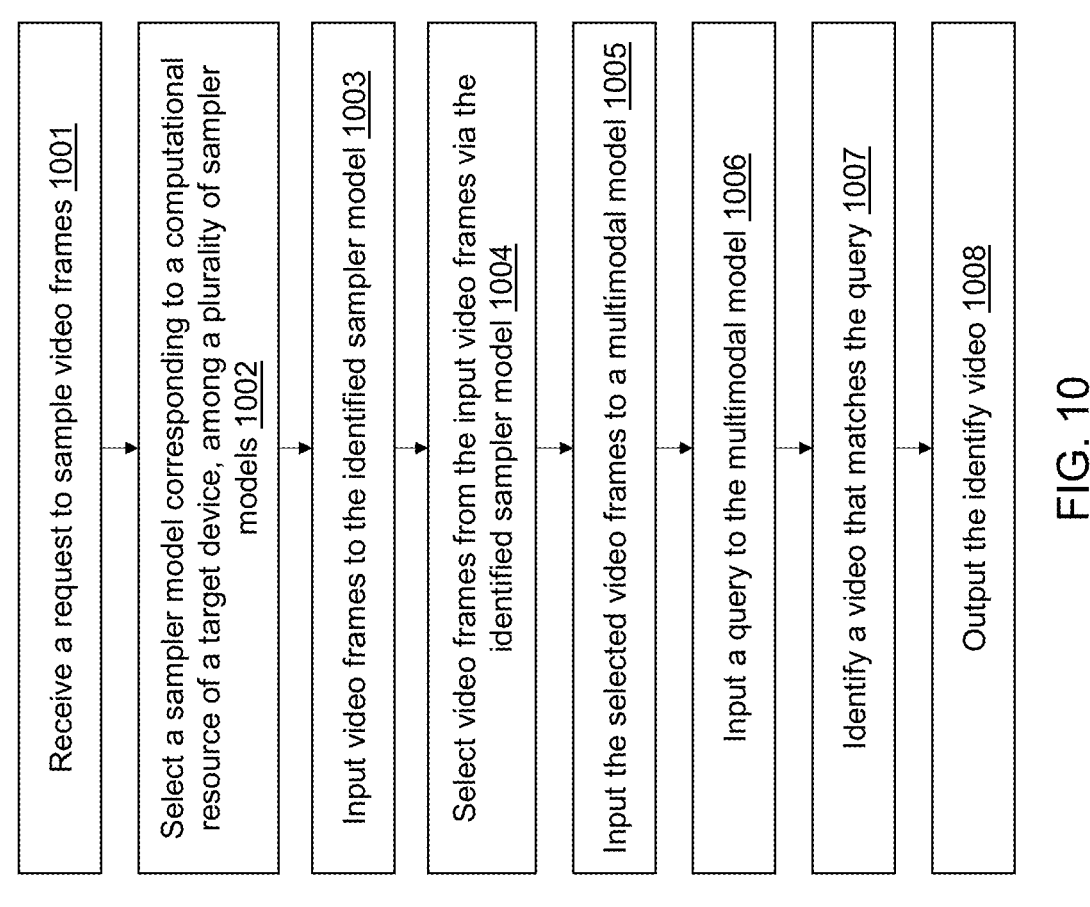

Receive a request to sample video frames 1001

Select a sampler model corresponding to a computational resource of a target device, among a plurality of sampler models 1002

Input video frames to the identified sampler model 1003

Select video frames from the input video frames via the identified sampler model 1004

Input the selected video frames to a multimodal model 1005

Input a query to the multimodal model 1006

Identify a video that matches the query 1007

Output the identify video 1008

FIG. 10

1100 USER DEVICE

1300 NETWORK

1200 SERVER

1300

1305

1303

1302

1301

1304

METHOD OF PROCESSING MULTIMODAL TASKS, AND AN APPARATUS FOR THE SAME

CROSS-REFERENCE TO RELATED APPLICATION(S)

This application is based on and claims priority under 35 U.S.C. § 119 to U.S. Provisional Patent Application No. 63/310,496, filed on Feb. 15, 2022, in the U.S. Patent & Trademark Office, the disclosure of which is incorporated by reference herein in its entirety.

BACKGROUND

1. Field

The disclosure relates to a method of processing multimodal tasks, and an apparatus for the same, and more particularly to a method of using an adaptive sampling technique to process multimodal tasks, and an apparatus for the same.

2. Description of Related Art

Video-and-language learning has shown significant progress in recent years. A wide range of tasks fall under the umbrella of natural language-based video understanding, including text-to-video retrieval, video summarization, and live video trigger.

The general approach for video and natural language understanding uses a joint embedding space in which both the video and the query are embedded and mapped, where semantically similar feature points are located closer in distance. Amongst the rich and diverse modalities that exist in videos, visual features play a critical role in video representation. Existing work on video retrieval handles encoding of the visual frames in two main approaches: dense sampling at a high frame rate (e.g., 25 FPS) and uniformly sampling at a low frame rate (e.g., 1 FPS). Dense sampling of all the frames could be expensive at both training and inference time, and may introduce unnecessary computational overhead. Furthermore, the conventional sampling approaches could inject uninformative, noisy frames into the final video embedding, resulting in sub-optimal performance in the downstream multimodal task.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a method and an apparatus for selecting salient frames to represent a video for a downstream multimodal task and discard non-informative frames.

According to an aspect of the disclosure, an electronic device may include: at least one memory storing one or more instructions; and at least one processor configured to execute the one or more instructions to: obtain a query from a user input; obtain a sequence of frames of one or more input videos; select frames from the sequence of frames of the one or more input videos, via a sampler neural network configured to extract features from the sequence of frames that are input to the sampler neural network, determine temporal dependencies between the extracted features, and determine an action of selecting or skipping for each of the sequence of frames; and identify a video that matches the query via a multimodal neural network configured to receive the selected frames and the query, and output the video that matches the query, among the one or more input videos, wherein the sampler neural network and the multimodal neural network are jointly trained based on an aggregated loss that combines an accuracy loss that represents an accuracy of determining the video that matches the query, and an efficiency loss that reflects a proportion of frames being passed to the multimodal neural network.

The multimodal neural network may be stored in the electronic device or a server, and when the multimodal neural network is stored in the server, the at least one processor is further configured to execute the one or more instructions to: transmit the query and the selected frames to the server; and identify the video that matches the query based on a response received from the server.

The electronic device may include: a communication interface configured to receive the user input including the query from an external device, and transmit the video that matches the query to the external device; and a camera, wherein the at least one processor may be further configured to execute the one or more instructions to obtain the one or more input videos via the communication interface or the camera.

The at least one processor may be further configured to execute the one or more instructions to: determine a computational resource of the electronic device; obtain the sequence of frames by sampling the one or more input videos at an interval corresponding to the computational resource of the electronic device; and input the sequence of frames to the sampler neural network to determine the action of selecting or skipping for each of the sequence of frames.

The at least one processor may be further configured to execute the one or more instructions to: determine a computational resource of the electronic device; identify the sampler neural network corresponding to the computational resource of the electronic device, among a plurality of sampler neural networks that are trained using difference weights for combining the accuracy loss and the efficiency loss; and select the frames using the sampler neural network that is identified from the plurality of sampler neural networks based on the computational resource of the electronic device.

The sampler model may be configured to stop providing the selected frames to the multimodal neural network and start providing the selected frames to another multimodal neural network, when the multimodal neural network stops operating and the other multimodal neural network starts running to perform a multimodal task.

The sampler neural network may be further configured to: determine the temporal dependencies based on hidden state values that are obtained from the extracted features; determine the action of selecting or skipping for each of the sequence of frames by inputting the hidden state values to fully connected layers; and determine the video that matches the query, based on similarity scores between the selected frames and the query.

The sampler neural network may include: a two-dimensional (2D) convolutional neural network (CNN) configured to extract the features; and a long short-term memory (LSTM) configured to identify the temporal dependencies between the extracted features.

The sampler neural network may include: a two-dimensional (2D) convolutional neural network (CNN) configured to extract the features; and a transformer configured to process the sequence of frames in parallel, and identify the temporal dependencies between the extracted feature through a self-attention mechanism.

The sampler neural network may be further configured to: obtain continuous functions that approximate a categorical distribution of selecting or skipping for each of the frames, as back-propagation data for the sampler neural network and the multimodal neural network.

The multimodal neural network may be further configured to: extract the features from the selected frames using a three-dimensional (3D) convolutional neural network (CNN); and process the features extracted by the 3D CNN via a projection layer and a pooling layer.

According to another aspect of the disclosure, a method of processing image data may include: obtaining a query from a user input; obtaining a sequence of frames of one or more input videos; selecting frames from the sequence of frames of the one or more input videos, via a sampler neural network configured to extract features from the sequence of frames that are input to the sampler neural network, determine temporal dependencies between the extracted features, and determine an action of selecting or skipping for each of the sequence of frames; and identifying a set of frames via a multimodal neural network configured to receive the selected frames and the query, and output the video that matches the query, among the one or more input videos, wherein the sampler neural network and the multimodal neural network may be jointly trained based on an aggregated loss that combines an accuracy loss that represents an accuracy of determining the video that matches the query, and an efficiency loss that reflects the proportion of frames being passed to the multimodal model.

The method may further include: determining a computational resource of the electronic device; obtaining the sequence of frames by sampling the one or more input videos at an interval corresponding to the computational resource of the electronic device; and inputting the sequence of frames to the sampler neural network to determine the action of selecting or skipping for each of the sequence of frames.

The method may further include: determining a computational resource of the electronic device; identifying the sampler neural network corresponding to the computational resource of the electronic device, among a plurality of sampler neural networks that are trained using difference weights for combining the accuracy loss and the efficiency loss; and selecting the frames using the sampler neural network that is identified from the plurality of sampler neural networks based on the computational resource of the electronic device.

The method may further include: determining the temporal dependencies based on hidden state values that are obtained from the extracted features; determining the action of selecting or skipping for each of the sequence of frames by inputting the hidden state values to fully connected layers; and determining whether the video matches the query, based on similarity scores between the selected frames and the query.

The method may further include: extracting the features via a two-dimensional (2D) convolutional neural network (CNN) included in the sampler neural network; and identifying the temporal dependencies between the extracted features via a long short-term memory (LSTM) included in the sampler neural network.

The method may further include: extracting the features via a two-dimensional (2D) convolutional neural network (CNN) included in the sampler neural network; and identifying the temporal dependencies between the extracted features via a transformer configured to process the sequence of frames in parallel, and identify the temporal dependencies between the extracted feature through a self-attention mechanism.

The method may further include: obtaining continuous functions that approximate a categorical distribution of selecting or skipping for each of the frames, as back-propagation data for the sampler neural network and the multimodal neural network.

The method may further include: extracting the features from the selected frames using a three-dimensional (3D) convolutional neural network (CNN); and processing the features extracted by the 3D CNN via a projection layer and a pooling layer.

According to another aspect of the disclosure, a non-transitory computer readable storage medium which is configured to, when executed by at least one processor, perform the method of processing image data may be provided.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 7 is a flowchart illustrating a method of training a video frame sampler model and a multimodal model according to embodiments of the present disclosure;

FIG. 9 illustrates a method of performing a video retrieval process in an interface stage according to embodiments of the present disclosure;

FIG. 10 illustrates a method of performing a video retrieval process in an interface stage according to other embodiments of the present disclosure;

DETAILED DESCRIPTION

Figure 1:
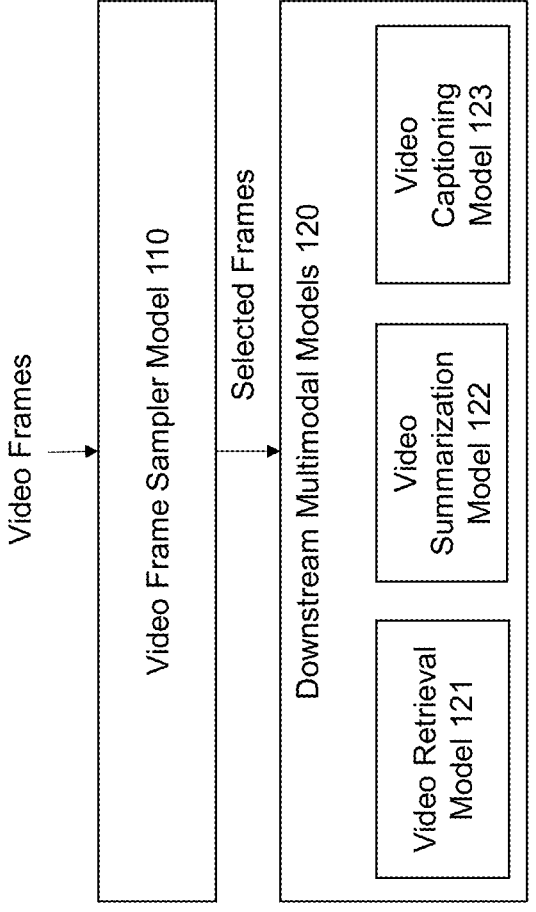
FIG. 1 is a diagram showing a computer system for selecting salient frames from a video for downstream multimodal models according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The term "image" may refer to a still image, a motion picture, an animated image, a video, a frame of a video, a set of frames of a video, a segment of a video, or a video clip.

The term "video" may refer to the entire video, or a part of the video, such as a segment or a clip of the video.

Throughout the present disclosure, the term "a frame" or "a video frame" may refer to a single video frame or may be understood as including more than one frame.

FIG. 1 is a diagram showing a computer system for selecting salient frames from a video for downstream multimodal models according to embodiments of the present disclosure.

The computer system may include a video frame sampler model (hereinafter "sampler model") 110 and downstream multimodal models 120 that include a video retrieval model 121, a video summarization model 122, and a video captioning model 123. The sampler model 110 and the downstream multimodal models 120 are artificial intelligence (AI)-based models, which include one or more neural networks. For example, the sampler model 110 may be embodied as a deep neural network (DNN)-based policy network. The sampler model 110 and the downstream multimodal models 120 may be also referred to as a sampler neural network and multimodal neural networks, respectively.

The sampler model 110 may receive a sequence of video frames from an internal camera or from an external device via a communication interface. The video frames that are input to the sampler model 110 may be a sequence of uniformly sampled frames of a video. For example, when the computer system obtains a video consisting of 1000 frames, a sequence of 500 frames that are sampled at a uniform interval may be input to the sampler model 110. However, the embodiments of the present disclosure are not limited thereto, and the entire frames of the video may be input into the sampler model 110, or non-uniformly sampled frames of the video may be input into the sampler model 110.

The sampler model 110 may select salient or important video frames among the sequence of video frames. The sampler model 110 may pass the selected video frames to the downstream multimodal models 120 to perform a downstream video-language understanding task via the video retrieval model 121, the video summarization model 122, and the video captioning model 123.

At each time step, the computer system may input a current frame into the sampler model 110, which may be embodied as one or more neural networks including a feature extractor and a temporal modeling module to capture temporal dependencies. In particular, the sampler model 110 may extract features from the current frame, determine temporal dependencies of the extracted features for example, via a long short-term memory (LSTM) or a transformer, and determine whether to keep (select) or skip the current frame based on the temporal dependencies of the extracted features. As video frames are input to the sampler model 110 in sequence, the sampler model 110 may make a decision to keep or skip each of the input video frames one by one in sequence. The sampler model 110 may pass the selected frames into the downstream multimodal models 120. The sampler model 110 can be trained end-to-end with any multimodal model.

The downstream multimodal models 120 may include the video retrieval model 121 configured to provide a video, a video segment, or an image corresponding to a query, the video summarization model 122 configured to provide a set of representative video frames that have been stitched in chronological order to form a summary of the video, and a video captioning model 123 configured to automatically generate description of the video based on visual features, motion features, and/or audio features extracted from the video.

Each of the downstream multimodal models 120 may be jointly trained with the sampler model 110. In particular, the video retrieval model 121 may compute a cross-entropy loss that represents the accuracy of a video that is retrieved as corresponding to the input query, and a uniform loss that represents the number of the video frames that are selected by the sampler model 110, out of a total number of the video frames. A first aggregated loss including the cross-entropy loss and the uniform loss may be back-propagated to the sampler model 110 to update model parameters (e.g., weights and biases of neural networks that constitute the sampler model 110) to minimize or converge the first aggregated loss. The sampler model 110 and the video retrieval model 121 may be trained until the first aggregated loss is minimized or converges. When a loss has reached a predetermined minimum threshold (e.g., a range from 0 to 0.01), or does not reduce any longer via an iterative training process and therefore converges to a constant value, it may be determined that the loss has been minimized or has converged.

The video summarization model 122 may compute a second aggregated loss that includes a cross-entropy loss that represents the accuracy of the summary of the video, and the uniform loss that represents the number of the video frames that are selected by the sampler model 110. The sampler model 110 and the video summarization model 122 may be trained until the second aggregated loss is minimized or converges.

The video captioning model 123 may compute a third aggregated loss that combines a cross-entropy loss that represents the accuracy of the description of the video, and the uniform loss that represents the number of the video frames that are selected by the sampler model 110. The sampler model 110 and the video captioning model 123 may be trained until the third aggregated loss is minimized or converges.

According to embodiments of the disclosure, the sampler model 110 may be jointly trained with each of the downstream multimodal models 120 via separate training processes, so that the sampler model 110 may have different sets of model parameters when interacting with the different downstream multimodal models 120. For example, the sampler model 110 may have a first set of model parameters, a second set of model parameters, and a third set of model parameters to operate with the video retrieval model 121, the video summarization model 122, and the video captioning model 123, respectively. However, the embodiments are not limited thereto, and the sampler model 110 may have a generalized set of model parameters to operate with any of the downstream multimodal models 120.

In an inference phase, the sampler model 110 may transmit the selected frames to at least one current running multimodal model (e.g., the video retrieval model 121), and when the currently running model is changed to another multimodal model (e.g., the video captioning model 123), the sampler model 110 may stop providing the selected frames to the previously running multimodal model (e.g., the video retrieval model 121), and may start transmitting the selected frames to the newly running multimodal model (e.g., the video captioning model 123).

Figures 2A, 2B:
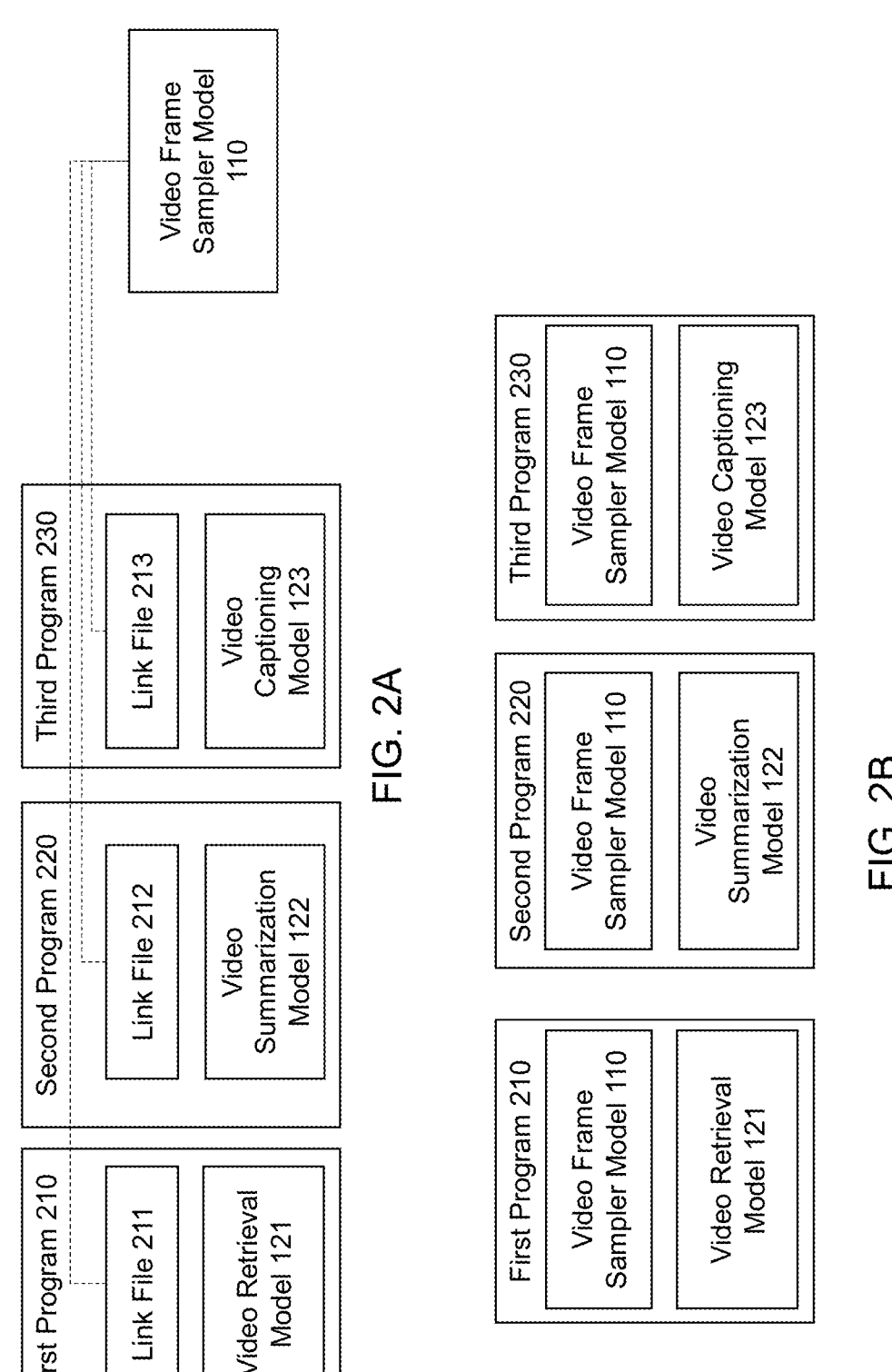
FIGS. 2A and 2B illustrates software programs that include a video frame sampler model and downstream multimodal models according to embodiments of the present disclosure.

FIGS. 2A and 2B illustrates software programs that include a video frame sampler model and downstream multimodal models according to embodiments of the present disclosure.

As shown in FIG. 2A, a first program 210 may include a first link file 211 and the video retrieval model 121, a second program 220 may include a second link file 212 and the video summarization model 122, and a third program 230 may include a third link file 213 and the video captioning model 123. The sampler model 110 may be provided and stored separately from the first program 210, the second program 220, and third program 230, and may be linked to corresponding multimodal models 121-123 using the first link file 211, the second link file 212, and the third link file 213, respectively. The first link file 211, the second link file 212, and the third link file 213 may include a compiled filename of the sampler model 110, and/or a search path to the sampler model 110. For example, when a device executes the first program 210, the device may load the sampler model 110 using the first link file 211 to operate the sampler model 110 in connection with the video retrieval model 121. The first link file 211, the second link file 212, and the third link file 213 may have a smaller file size than the sampler model 110. The sampler model 110 may have a single generalized set of model parameters, or may have a plurality of different sets of model parameters which are customized for the different downstream multimodal models 121-123, respectively. For example, an electronic device may download and install the first program 210 on an electronic device, and may separately download and install the sampler model 110 on the electronic device. When the electronic device executes the first program 210, the first link file 211 may load and execute the sampler model 110, to operate the video retrieval model 121 in connection with the sampler model 110.

Alternatively, referring to FIG. 2B, the sampler model 110 may be included in each of the first program 210, the second program 220, and the third program 230. The sampler model 110 may be customized for its corresponding downstream multimodal model 120 (i.e., the video retrieval model 121, the video summarization model 122, or the video captioning model 123, respectively). For example, the sampler model 110 included in the first program 210 has model parameters that are obtained via joint training of the sampler model 110 and the video retrieval model 121, while the sampler model 110 included in the second program 220 has model parameters obtained via joint training of the sampler model 110 and the video summarization model 122. However, the embodiments are not limited thereto, and a generalized sampler model may be commonly used for the video retrieval model 121, the video summarization model 122, or the video captioning model 123.

Figure 3:
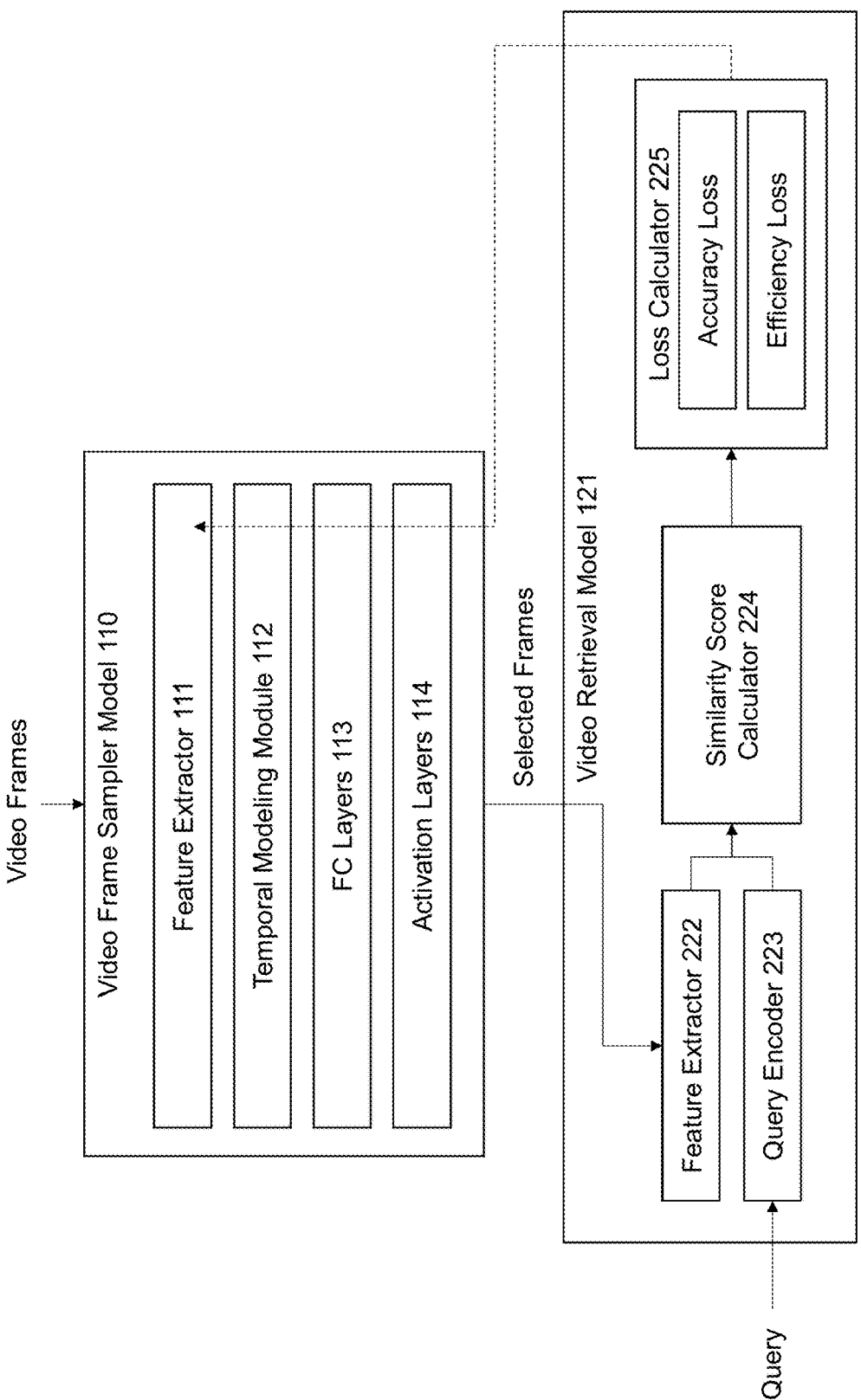
FIG. 3 illustrates a diagram showing a computer system for selecting salient frames from a video for a video retrieval model according to embodiments of the present disclosure.

FIG. 3 illustrates a diagram showing a computer system for selecting salient frames from a video for a video retrieval model according to embodiments of the present disclosure.

Referring to FIG. 3, the computer system may include a video frame sampler model (also referred to as "sampler model") 110 and a video retrieval model 121. Each of the sampler model 110 and the video retrieval model 121 may be implemented using an AI technology and may include one or more neural networks.

As input to the sampler model 110, the computer system may uniformly sample a fixed number of frames from each video. The sampler model 110 may process input frames one-by-one in sequence or may process multiple input frames in parallel.

The sampler model 110 may include a feature extractor 111, a temporal modeling module 112, fully-connected layers 113, and activation layers 114 to discard more redundant frames for efficiency while preserving informative frames, to maintain the retrieval accuracy of the video retrieval model 121.

The feature extractor 111 may extract visual features from each frame, to obtain spatial information and motion information in the video. The feature extractor 111 may be embodied as a pre-trained two-dimensional (2D) convolutional neural network (CNN), such as ResNet, EfficientNet, or MobileNet. The feature extractor 111 may perform downsizing and gray-scaling on image pixels of each frame, and may convert the image pixels into a 1D vector to serve as a feature input to the temporal modeling module 112.

In an embodiment, the feature extractor 111 may extract visual features, for example, RGB features or luma features which capture spatial information (e.g., the appearance of objects) in the video. The spatial information may enable the sampler model 110 to remove the frames including uninformative scenes or objects. The feature extractor 111 may pass the visual features into the temporal modeling module 112 with no additional change.

In another embodiment, the feature extractor 111 may extract the visual features and compute a difference of the visual features (e.g., RGB-difference features or luma-difference features) between two consecutive frames, which captures motion information in the video. The motion information may enable the sampler model 110 to learn temporal dependencies between frames and thereby to remove interframe redundancies without degrading the retrieval performance of the video retrieval model 121.

In another embodiment, the feature extractor 111 may concatenate the visual features and the visual-difference features to factor in both spatial and motion information. In particular, the feature extractor 111 may extract the visual features, compute the difference of the visual features, and apply a concatenation operation to the visual features and the visual feature difference to form a one-dimensional (1D) vector.

The feature extractor 111 may provide the extracted visual features (e.g., the RGB features, the RGB-difference features, or concatenated features of the RGB features and the RGB-difference features) to the temporal modeling module 112 to model temporal relations in the video.

At each time step for processing a current video frame, the temporal modeling module 112 may take the current frame features and a previous state to generate a new hidden state vector. For example, the temporal modeling module 112 may be embodied as a recurrent neural network such as an LSTM or a transformer network, which will be described later with reference to FIGS. 4 and 5.

The temporal modeling module 112 may pass the hidden state vector into fully-connected (FC) layers 113. In particular, the temporal modeling module 112 may output a hidden representation for each frame to incorporate information from the other frames into the current frame. The hidden state vector is projected into a dimension of 2—where the logits represent keeping or skipping the frame.

The fully-connected layers 113 may output logits for an action space that consists of two discrete actions: keeping (selecting) or skipping the current frame, based on the hidden state vector provided from the temporal modeling module 112. The logits may represent un-normalized probability for the discrete actions of keeping (selecting) or skipping the frame.

The logics are fed to an activation layer 114 configured to generate a probability for each action (e.g., 0.7 for a keeping action and 0.3 for a skipping action) in a sampling space. The activation layer 114 may apply a process, such as Gumbel-Softmax algorithm, to select an action from a continuous Gumbel-Softmax distribution. The Gumbel-Softmax algorithm may be applied to obtain continuous functions that approximate a categorical distribution of selecting or skipping for each of the frames, so that back-propagation data is obtained for training the sampler model 110 and the multimodal models 120. The Gumbel-Softmax algorithm may enable the sampler model 110 to compute gradients of a loss function for training the sampler model 110 end-to-end with the video retrieval model 121.

Specifically, at each time step t, a vector of logits $z \in R^n$ may be output from the activation layer 114, where n denotes the size of the action space, that is 2 (i.e., the keep action and the skip action). The logits are passed into a Softmax activation function to generate probabilities p for each action in the sampling space. The probability for an $i^{th}$ action may follow a categorical distribution $\pi_t$, which is expressed as follows:

$$\pi_t\left\{p_i \mid p_i = \frac{\exp(z_i)}{\sum_{j=0}^{n-1}\exp(z_j)}\right\}, i \in [0, \ldots, n-1] \qquad \text{Equation (1)}$$

The categorical distribution $\pi_t$ may be re-parameterized by a standard Gumbel noise $G_i = -\log(-\log U_i)$ being added to the categorical distribution $\pi_t$, where $U_i$ may be independently and identically distributed from a uniform distribution. In a forward pass, an action $\hat{p}$ from the re-parameterized distribution may be sampled, where the sampled actions $\hat{p}$ are distributed according to distribution $\pi_t$ as follows:

$$\hat{p} = \arg\max_i(\log p_i + G_i) \qquad \text{Equation (2)}$$

Since the arg max operator in Equation (2) is still non-differentiable, a Gumbel-Softmax technology may be applied to approximate the arg max operator with a continuous Softmax function as follows to allow backpropagation:

$$q_i = \frac{\exp\big((\log p_i + G_i)/\tau\big)}{\sum_{j=0}^{n-1}\exp\big((\log p_j + G_j)/\tau\big)}, i \in [0, \ldots, n-1] \qquad \text{Equation (3)}$$

Wherein $q_i$ denotes a probability of choosing the $i^{th}$ action and $\tau$ denotes a temperature parameter that controls how close the Gumbel-Softmax distribution is to the original categorical distribution $\pi_t$. As $\tau$ approaches zero, the samples drawn from the Gumbel-Softmax distribution become one-hot. For example, $\tau$ is initially set to a fixed value and gradually annealed down to a small non-zero temperature during training. Via the Gumbel-Softmax sampling technique, the sampler model 110 is able to sample from the true categorical distribution in the forward pass, while also allowing the sampler model 110 to be optimized via backpropagation.

Once the sampler model 110 decides an action to take for each frame (i.e., an action of keeping or skipping each frame), the selected frames are passed into the video retrieval model 121 for the downstream task of the video retrieval. The sampler model 110 may transmit the selected frames themselves to the video retrieval model 121, or may provide the video retrieval model 121 with an identification of the selected frames, such as elapsed time information of each of the selected frames in the video, so that the video retrieval model 121 selects frames based on the frame identification when the entire video data is directly fed to the video retrieval model 121.

The video retrieval model 121 may include a feature extractor 122, a query encoder 223, a similarity score calculator 224, and a loss calculator 225. The feature extractor 122 of the video retrieval model 121 may be a heavier neural network (e.g., a greater number of layers and connections) than the feature extractor 111 in the sampler model 110. For example, the feature extractor 122 may be embodied as a pre-trained two-dimensional (2D) convolutional neural network (CNN), a pre-trained three-dimensional (3D) CNN or a transformer-based encoder. However, the embodiments are not limited thereto, and the feature extractor 111 in the sampler model 110 may have the same or substantially the same structure as the feature extractor 122 in the video retrieval model 121.

The feature extractor 122 may extract visual features from each frame, to obtain spatial information and motion information in the video. In an embodiment, the feature extractor 122 may extract visual features, for example, RGB features or luma features which capture spatial information (e.g., the appearance of objects) in the video. The spatial information may enable the sampler model 110 to remove the frames including uninformative scenes or objects. The feature extractor 122 may pass a video embedding that represents the visual features into the similarity score calculator 224 with no additional change.

In another embodiment, the feature extractor 122 may extract the visual features and compute a difference of the visual features (e.g., RGB-difference features or luma-difference features) between two consecutive frames, and may pass a video embedding that represents the difference of the visual features into the similarity score calculator 224.

In another embodiment, the feature extractor 122 may apply a concatenation operation to the visual features and the visual feature difference to form a video embedding that represents the combination of the visual features and the visual feature.

The video embedding obtained from each of the selected frames may be aggregated into a final video embedding via mean pooling.

The query encoder 223 may extract query features from a query that is input to the video retrieval model 121, and may output a query embedding that represents the extracted query features. The query may be obtained from a user input, such as a text input or a voice input. The voice input may be converted into text for the query encoder 223 to extract the query features.

The final video embedding and the query embedding may be projected into a joint embedding space, where semantically similar feature points are placed closer to each other in distance. For example, a linear projection layer may be used to map the final video embedding and the query embedding to the joint embedding space.

The similarity score calculator 224 may compute a similarity score between the video embedding and the query embedding. Given B video-text pairs during training, the similarity score calculator 224 may compute $B^2$ cosine similarity scores between each video and text data point, to maximize similarity scores for B positive video-text pairs, and minimize similarity scores for the remaining $(B^2-B)$ negative video-text pairs to learn an effective multimodal joint representation. The similarity score calculator 224 may pass the similarity score into the loss calculator 225 for a loss calculation.

The loss calculator 225 may compute an accuracy loss and an efficiency loss. In the video retrieval model 121, the accuracy loss may represent a contrastive loss (e.g., a symmetric cross entropy loss or a max-margin bidirectional ranking loss) which brings together positive (i.e., matching) video-text pairs in the joint embedding space, and pulls part negative (i.e., non-matching) video-text pairs. Although FIG. 2 illustrates only the video retrieval model 121, any multimodal model configured to process a selected set of video frames, may operate in connection with the sampler model 110, as shown in FIG. 1. For example, when the video summarization model 122 operates in connection with the sampler model 110, the accuracy loss may represent a diversity loss which captures a visual diversity of all the selected frames.

Referring to FIG. 3, the accuracy loss of the video retrieval model 121 may be computed as follows:

$$L_{v2t} = -\frac{1}{B}\sum_{x=0}^{B-1}\log\frac{\exp(s_{x,x})}{\sum_{y=0}^{B-1}\exp(s_{x,y})} \qquad \text{Equation (4)}$$

$$L_{t2v} = -\frac{1}{B}\sum_{x=0}^{B-1}\log\frac{\exp(s_{x,x})}{\sum_{y=0}^{B-1}\exp(s_{y,x})} \qquad \text{Equation (5)}$$

$$L_r = \frac{1}{2}(L_{v2t} + L_{t2v}) \qquad \text{Equation (6)}$$

Wherein B denotes a batch size, $s_{x,y}$ denotes a cosine similarity between a $x^{th}$ video and a $y^{th}$ caption, $s_{y,x}$ denotes a cosine similarity between a $y^{th}$ video and a $x^{th}$ caption, $s_{y,y}$, $s_{x,x}$ represents a similarity score of a positive video-text pair. For each positive video-text pair, (2B-2) sets of negative pairs may be used to compute the accuracy loss.

If only the accuracy loss is used, the video retrieval model 121 may be inclined to use almost all the frames to maximize the retrieval performance of the video retrieval model 121. Therefore, the video retrieval model 121 may adopt the efficiency loss in addition to the accuracy loss. The efficiency loss may be a uniform loss that encourages the sampler model 110 to sample different actions while penalizing the sampler model 110 for being biased towards a particular action. For example, the efficiency loss may be computed as follows:

$$c_i = \frac{1}{B \times T}\sum_{b=0}^{B-1}\sum_{t=0}^{T-1}\mathbb{1}(a_{b,t} = i) - \frac{1}{n}, i \in [0, \ldots, n-1] \qquad \text{Equation (7)}$$

$$L_u = \|c\|_2 \qquad \text{Equation (8)}$$

Wherein n denotes the total number of actions, $\|\cdot\|_2$ represents a L2 norm, and $\mathbb{1}(\cdot)$ represents an indicator function. $\mathbb{1}(\alpha_{b,t}=i)$ equals 1 if a selected action at time step t for a $b^{th}$ sample video equals to an $i^{th}$ action in the action space; otherwise it is 0. The term $c_i$ compares the frequency of picking the $i^{th}$ action in a batch with an (predetermined) expected frequency. The efficiency loss may reflect the proportion of frames being passed to the multimodal neural network, and may act as a regularizer to penalize actions whose sampling frequency does not meet the expected frequency.

The loss calculator 225 may calculate an aggregated loss that combines the accuracy loss and the efficiency loss as the final training objective for the system including the sample model 110 and the video retrieval model 121. For example, the aggregated loss may be computed as follows:

$$L = \omega_r * L_r + \omega_u * L_u \qquad \text{Equation (9)}$$

Wherein $\omega_r$ and $\omega_u$ denote weights for the accuracy loss and the efficiency loss, respectively.

The weights for the accuracy loss and the efficiency loss may be empirically predetermined values. For example, the weight for the accuracy loss (e.g., approximately 1) may be set higher than the weight for the efficiency loss (e.g., a range of 0.003 to 0.03) to maintain a high retrieval performance. However, the embodiments are not limited thereto, and the weights for the accuracy loss and the efficiency loss may be adaptively adjusted based on a computational resource of a target device. A method of adjusting the weights for the accuracy loss and the efficiency loss will be further described later in connection with FIG. 8.

Figure 4:
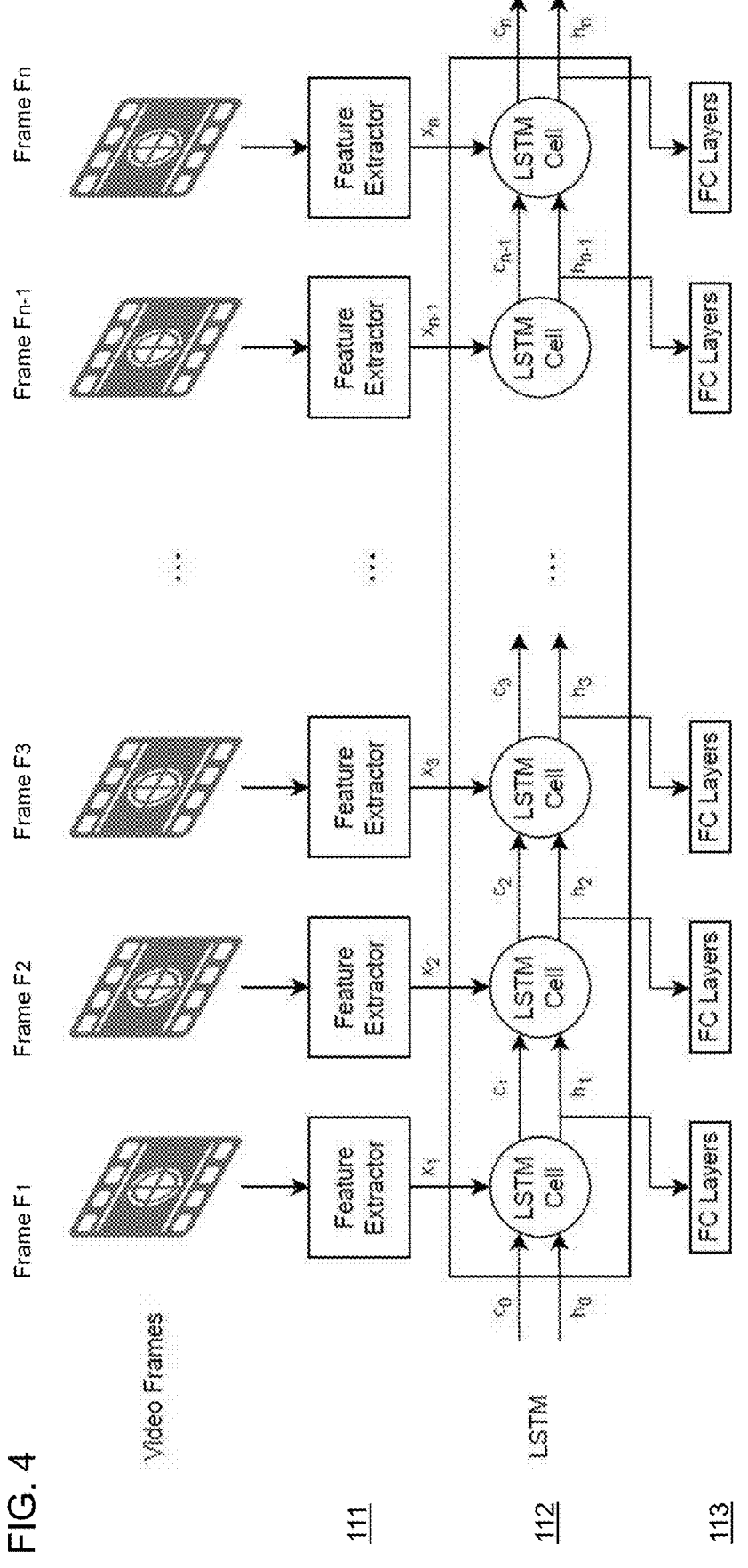
FIGS. 4 and 5 are block diagrams illustrating a temporal modeling module according to various embodiments of the present disclosure.
Figure 5:
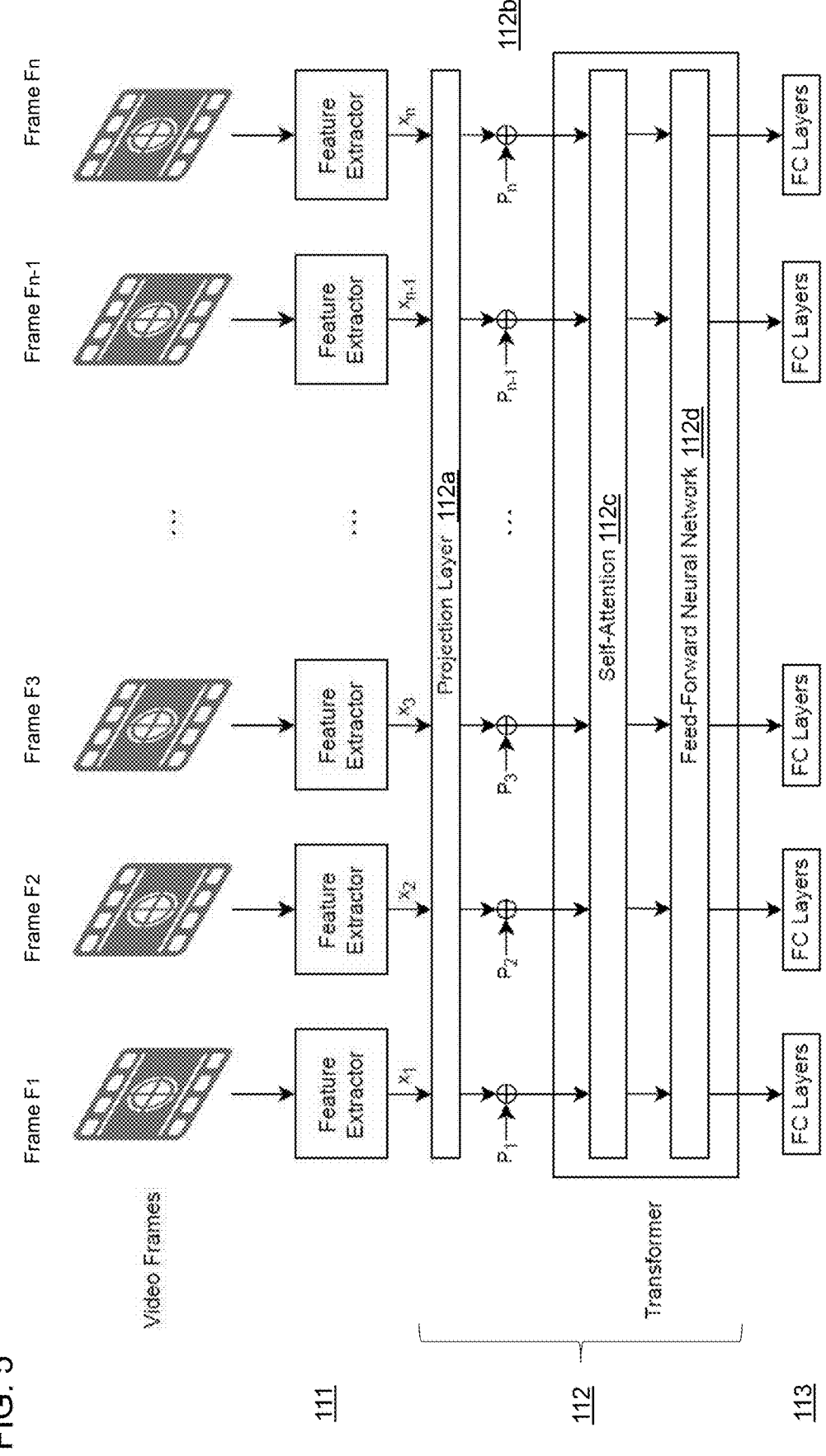

FIGS. 4 and 5 are block diagrams illustrating a temporal modeling module according to various embodiments of the present disclosure.

As shown in FIG. 4, the temporal modeling module 112 may be implemented as a long short-term memory (LSTM) network that includes a plurality of LSTM cells. The LSTM network may generate new hidden states (features) for each input frame feature based on current data and previous data, but not future data.

Referring to FIG. 4, $c_t$ represents an $i^{th}$ cell state, $h_t$ represents a $t^{th}$ hidden state, and $x_t$ represents a $t^{th}$ input feature. Each LSTM cell has a cell state $c_t$ that stores an internal memory of the LSTM network, and outputs a new hidden state $h_t$ based on features $x_t$ extracted from a current frame, and a previous hidden state $h_{t-1}$. The new hidden state that is output from each of the LSTM cells is input to the fully-connected layers 113. Although FIG. 4 illustrates a separate block of fully-connected layers 113 for each frame, the embodiments are not limited thereto, and the output features may be passed through the same set of fully-connected layers 113.

As shown in FIG. 5, the temporal modeling module 112 may be implemented as a transformer configured to process a sequence of frames in parallel. In processing each frame, the transformer may attend to every other frame to generate a new set of features.

Specifically, the temporal modeling module 112 may include a projection layer 112a, adders 112b, a self-attention layer 112c, and a feed-forward neural network 112d.

When a feature $x_t$ is extracted from an input frame, the feature $x_t$ is input to the projection layer 112a. Each extracted feature $x_t$ may be projected to the same dimension via the projection layer 112a. In turn, a positional encoding Pt may be added to each feature $x_t$ via the adder 112b to retain positional information of the input frame. The positional encoding Pt may allow the temporal modeling module 112 to know the location of each frame and the distance between the frames. The projected features $x_t$ with the positional encoding Pt may pass through the self-attention layer 112c configured to capture a relationship between a current frame and all the other frames, and then may be fed into the feed-forward neural network 112d. The output features Pt of the feed-forward neural network 112d are provided to the fully-connected layers 113 to output a new set of features (embeddings) that capture the relation of a frame and every other frame in the sequence. Although FIG. 5 illustrates a separate block of fully-connected layers 113 for each frame, the embodiments are not limited thereto, and the output features may be passed through the same set of fully-connected layers 113.

Figure 6:
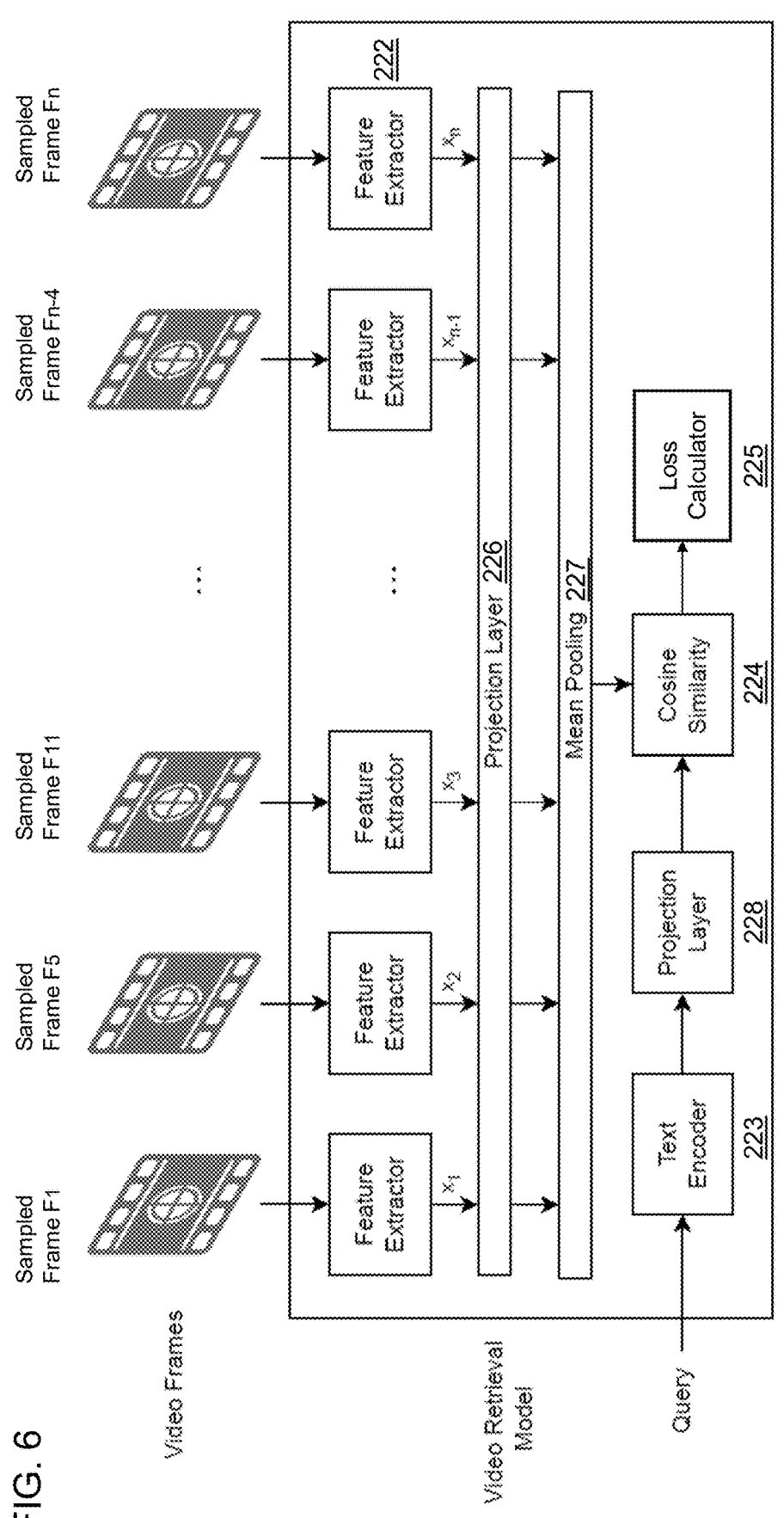
FIG. 6 is a block diagram illustrating an internal structure of a video retrieval model according to embodiments of the present disclosure.

FIG. 6 is a block diagram illustrating an internal structure of a video retrieval model according to embodiments of the present disclosure.

Referring to FIGS. 3 and 6, the video retrieval model 121 may further include two projection layers 226 and 228 configured to project a query embedding and a video embedding into a joint embedding space, respectively, a mean pooling layer 227 configured to generate a representative video embedding for a sequence of input frames, and a cosine similarity calculator 224 configured to calculate a cosine similarity between two embedding vectors that are output from the mean pooling layer 227 and the projection layer 228. The other elements of the video retrieval model 121 in FIG. 6 may operate in the same or substantially the same manner as those illustrated in FIG. 3.

FIG. 7 is a flowchart illustrating a method of training a video frame sampler model and a multimodal model according to embodiments of the present disclosure.

In operation 701, a multimodal model may receive a query via a touch screen, a keyboard, or a microphone, or via a communication interface configured to receive the query from an external device. When the query is received through a voice signal, speech-to-text conversion may be performed on the voice signal to obtain text information corresponding to speech in the voice signal.

In operation 702, a sampler model may receive a request to select frames from a sequence of video frames. The receipt of the query may trigger the multimodal model and the sampler model to start to operate. For example, when the multimodal model receives the query, a processor or the multimodal model may send a request to select frames to the sampler model. The sampler model and the multimodal model may be stored and operated in the same device, or different devices (e.g., a user device and a server).

In operation 703, the sampler model may receive as input a sequence of frames of a video. The video may be a streaming video provided from a content providing server, a video stored on a local memory of an electronic device, or a video captured by a camera of the electronic device, such as a sequence of images captured by a camera of a robot vacuum cleaner.

In operation 704, the sampler model may extract features from the input frames, for example, using the feature extractor 111 illustrated in FIG. 3.

In operation 705, the sampler model may select frames among the plurality of input frames, based on the extracted features, for example using the temporal modeling module 112, the fully-connected layers 113, and the activation layers 114.

In operation 706, the sampler model may provide the selected frames to the multimodal model. When a plurality of multimodal models run in the system at the same time, the sampler model may provide the selected frames to the plurality of multimodal models.

In operation 707, the multimodal model may extract features from the selected frames, for example, using the feature extractor 122. When the multimodal model extract features from the selected frames, the multimodal model may use a heavier neural network than the sampler model. For example, the feature extractor 122 of the multimodal model may include a 3D CNN, and the feature extractor 111 of the sampler model may include a 2D CNN.

In operation 708, the multimodal model may acquire a video embedding based on the features extracted from the selected frames, and may acquire a query embedding based on the query received in operation 701.

In operation 709, the multimodal model may compute a similarity score between the video embedding and the query embedding.

In operation 710, the multimodal model may compute an aggregated loss that combines an accuracy loss and an efficiency loss, for example, using the loss calculator 225 illustrated in FIG. 3. Equations (4)-(6) and Equations (7)-(8) may be used to compute the accuracy loss and the efficiency loss, respectively, and Equation (9) may be used to compute the aggregated loss.

The weight for the efficiency loss is typically in the range of 0.003 to 0.03, while the weight for the accuracy loss is set to approximately 1.

In operation 711, the sampler model and the multimodal model are updated to minimize or converge the aggregated loss. When the aggregated loss is minimized to its minimum point or reaches a preset minimum threshold, or the aggregated loss converges to a constant value (with a preset margin), it is determined that the aggregated loss is minimized or converges.

Either one or both of the trained sampler model and the trained multimodal model may be provided in a target device. For example, the trained sampler model may be provided in the target device, and the trained multimodal model may be provided in a server that communicates with the target device. Additionally, the target device (and/or the server) may perform an inference process using the pre-trained sampler model and the pre-trained multimodal model without an additional training process, or the target device (and/or the server) may further update the pre-trained sampler model and the pre-trained multimodal model via ongoing real-time training.

Figure 8:
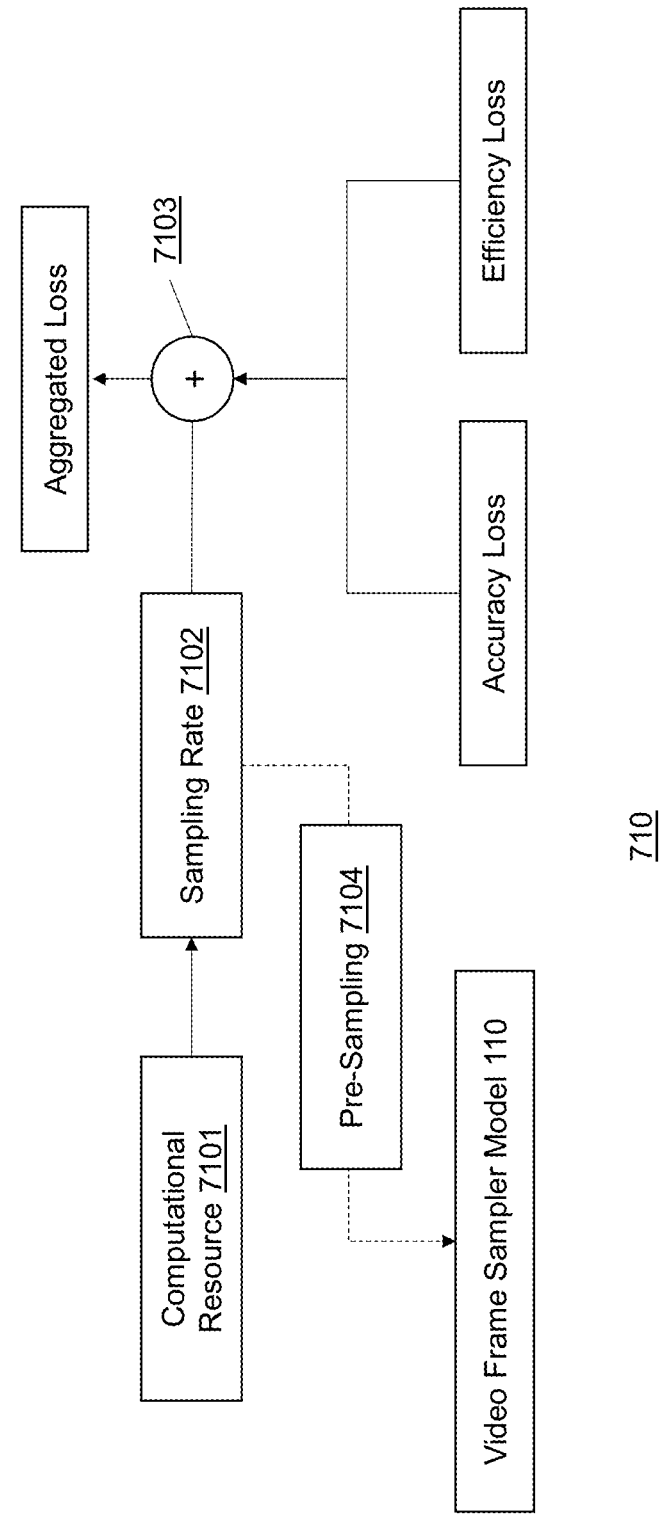
FIG. 8 illustrates a method of adjusting a sampling rate according to embodiments of the present disclosure.

FIG. 8 illustrates a method of adjusting a sampling rate according to embodiments of the present disclosure.

Referring to FIG. 8, operation 710 of FIG. 7 may include operation 7101 of determining a computational resource of a target device (to which either one or both of the sampler model and the multimodal model are deployed), operation 7102 of computing a sampling rate based on the computational resource of the target device, and operation 7103 of determining weights for the accuracy loss and efficiency loss, respectively. For example, default weights for the accuracy loss and the efficiency loss may be set to 0.7 and 0.3, respectively, to give a higher priority to accuracy than reducing the computational overhead of the target device. When the computational resource of the target device is lower than a predetermined threshold, the sampling rate may be computed based on the computational resource of the target device, and then the weights for the accuracy loss and the efficiency loss may be adjusted accordingly. For example, the weights for the accuracy loss and the efficiency loss may be changed from 0.7 and 0.3 to 0.6 and 0.4, respectively. The target device may include a plurality of sampler models which are trained based on different weights for the accuracy loss and the efficiency loss.

Alternatively, or combined with operation 7103, operation 7104 of pre-sampling may be performed on a sequence of video frames before being input to the sampler model 110, based on the sample rate that is determined according to the computational resource of the target device. For example, when a video consists of 10,000 frames and the computational resource of the target device is lower than the predetermined threshold, 800 frames may be sampled from the 10,000 frames at a uniform interval, to be input to the sampler model 110.

FIG. 9 illustrates a method of performing a video retrieval process in an interface stage according to embodiments of the present disclosure.

In operation 901, a request to sample video frames may be received.

In operation 902, an input frame rate may be adjusted based on a computational resource of a target device.

In operation 903, a sequence of frames of a video may be sampled (for example, at a uniform interval) based on the input frame rate, and the sampled frames may be input to a sampler model (e.g., the sampler model 110 illustrated in FIGS. 1 and 2).

In operation 904, the sampler model may select frames from the input frames, for example using the temporal modeling module 112, the fully-connected layers 113, and the activation layers 114.

In operation 905, the selected frames may be input to one or more multimodal models (e.g., a video retrieval model 121, video summarization model 122, and/or a video captioning model 123 illustrated in FIG. 1). For concise description, operations 906-908 are described based on the video retrieval model among various types of multimodal models.

In operation 906, a query may be input to the video retrieval model.

In operation 907, the video retrieval model may identify a video that matches or corresponds to the query, for example, using the feature extractor 122, the query encoder 223, and the similarity score calculator 224. Among the frames input to the video retrieval model, a video having a highest similarity score with the input query may be identified as the video that matches the query.

In operation 908, the video retrieval model may output the identified video as a result of the video retrieval process.

According to embodiments of the disclosure, the order of operations 901-908 may change to be different from the order illustrated in FIG. 9. For example, operation 906 may occur before operation 901 or at the same time as operation 901. Also, the order of operations 901-908 may be performed in the same device or multiple different devices. For example, operation 904 may be performed in a client device, and operation 907 may be performed in a server.

FIG. 10 illustrates a method of performing a video retrieval process in an interface stage according to other embodiments of the present disclosure.

In operation 1001, a request to sample video frames may be received.

In operation 1002, among a plurality of sampler models that are trained using different weights for the accuracy loss and the efficiency loss, a sampler model corresponding to a computational resource of a target device may be selected. For example, there may be provided a first sampler model which is trained using weight values of 0.8 and 0.2 for the accuracy loss and the efficiency loss, respectively, a second sample model which is trained using weight values of 0.7 and 0.3 for the accuracy loss and the efficiency loss, respectively, and a third sample model which is trained using weight values of 0.6 and 0.4 for the accuracy loss and the efficiency loss, respectively. In such a case, when the computational resource is in a preset high range, the first sampler model may be selected. When the computational resource is in a preset middle range, the second sampler model may be selected. When the computational resource is in a preset low range, the third sampler model may be selected. The less the computation resource, the sampler model having the relatively higher efficiency loss than the accuracy loss compared to the other sampler models, may be selected for video frame sampling.

In operation 1003, a sequence of frames of a video are input to the selected sampler model. Before the frames are input to the selected sampler model, operation 902 may be additional performed, but according to various embodiments, operation 902 may be omitted.

In operation 1004, the sampler model may select frames from the input frames, for example using the temporal modeling module 112, the fully-connected layers 113, and the activation layers 114.

In operation 1005, the selected frames may be input to one or more multimodal models (e.g., a video retrieval model 121, video summarization model 122, and/or a video captioning model 123 illustrated in FIG. 1). For concise description, operations 1006-1008 are described based on the video retrieval model among various types of multimodal models.

In operation 1006, a query may be input to the video retrieval model.

In operation 1007, the video retrieval model may identify a video that matches or corresponds to the query, for example, using the feature extractor 122, the query encoder 223, and the similarity score calculator 224. Among the videos input to the video retrieval model, a video (or a video segment) having a highest similarity score with the input query may be identified as the video that matches the query.

In operation 1008, the video retrieval model may output the identified video as a result of the video retrieval process.

According to embodiments of the disclosure, the order of operations 1001-1008 may change to be different from the order illustrated in FIG. 10. For example, operation 1006 may occur before operation 1001 or at the same time as operation 1001. Also, the order of operations 1001-1008 may be performed in the same device or multiple different devices. For example, operation 1004 may be performed in a client device, and operation 1007 may be performed in a server.

Figure 11:
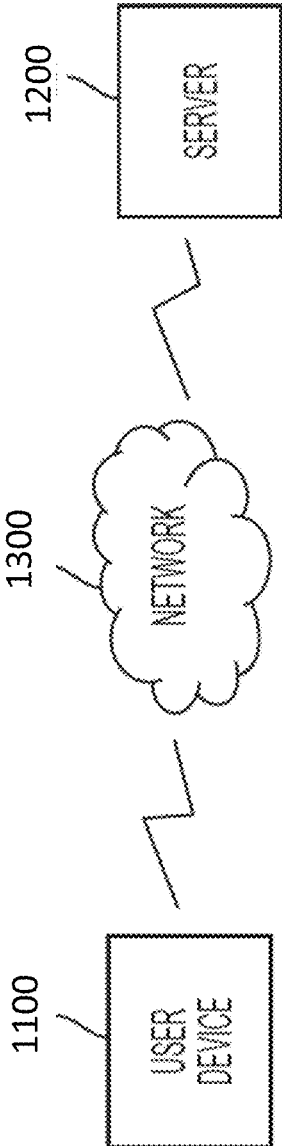
FIG. 11 is a diagram of electronic devices for performing a multimodal task according to embodiments of the present disclosure.

FIG. 11 is a diagram of devices for performing a multimodal task according to embodiments. FIG. 11 includes a user device 1100, a server 1200, and a network 1300. The user device 1100 and the server 1200 may interconnect via wired connections, wireless connections, or a combination of wired and wireless connections.

The user device 1100 includes one or more devices configured to generate an output image. For example, the user device 1100 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses, a smart watch, etc.), a home appliance (e.g., a robot vacuum cleaner, a smart refrigerator, etc.), or a similar device. The user device 1100 may be configured to train a sampler model 110 or multimodal models 120, and/or operate the trained sampler model 110 or the trained multimodal models 120. For example, the user device 1100 may include the trained sampler model 110, which inter-operated with the trained multimodal models 120 included in the server 1200. The user device 1100 may receive a query via an input interface (e.g., a touch screen, a keyboard, a microphone, etc.) or from an external device via wired or wireless communication. Also, the user device 1100 may receive a video via a camera mounted thereon, or from an external device (e.g., a content providing server or another user device). The user device 1100 may select frames from the video using the sampler model 110, and may transmit the selected frames and the query to the server 1200 so that the server 1200 performs a language-based multimodal task based on the selected frames and the query. Once the server 1200 retrieves a video that matches the query using the multimodal models 120, the server 1200 may transmit the retrieved video to the user device 1100 so that the user device 1100 presents the retrieved video to the user via a display screen.

The server 1200 includes one or more devices configured to train the sampler model 110 or the multimodal models 120, and/or operate the trained sampler model 110 or the trained multimodal models 120. For example, the server 1200 may include the multimodal models 120, and may receive a query and a set of selected frames from the user device 110, which includes the sampler model 110. In such a case, the server 1200 may identify a video matching the query, and may provide the identified video to the user device 110 as a video retrieval result.

The network 1300 includes one or more wired and/or wireless networks. For example, network 1300 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 1. Furthermore, two or more devices shown in FIG. 11 may be implemented within a single device, or a single device shown in FIG. 11 may be implemented as multiple, distributed devices. Additionally, or alternatively, a set of devices (e.g., one or more devices) may perform one or more functions described as being performed by another set of devices.

Figure 12:
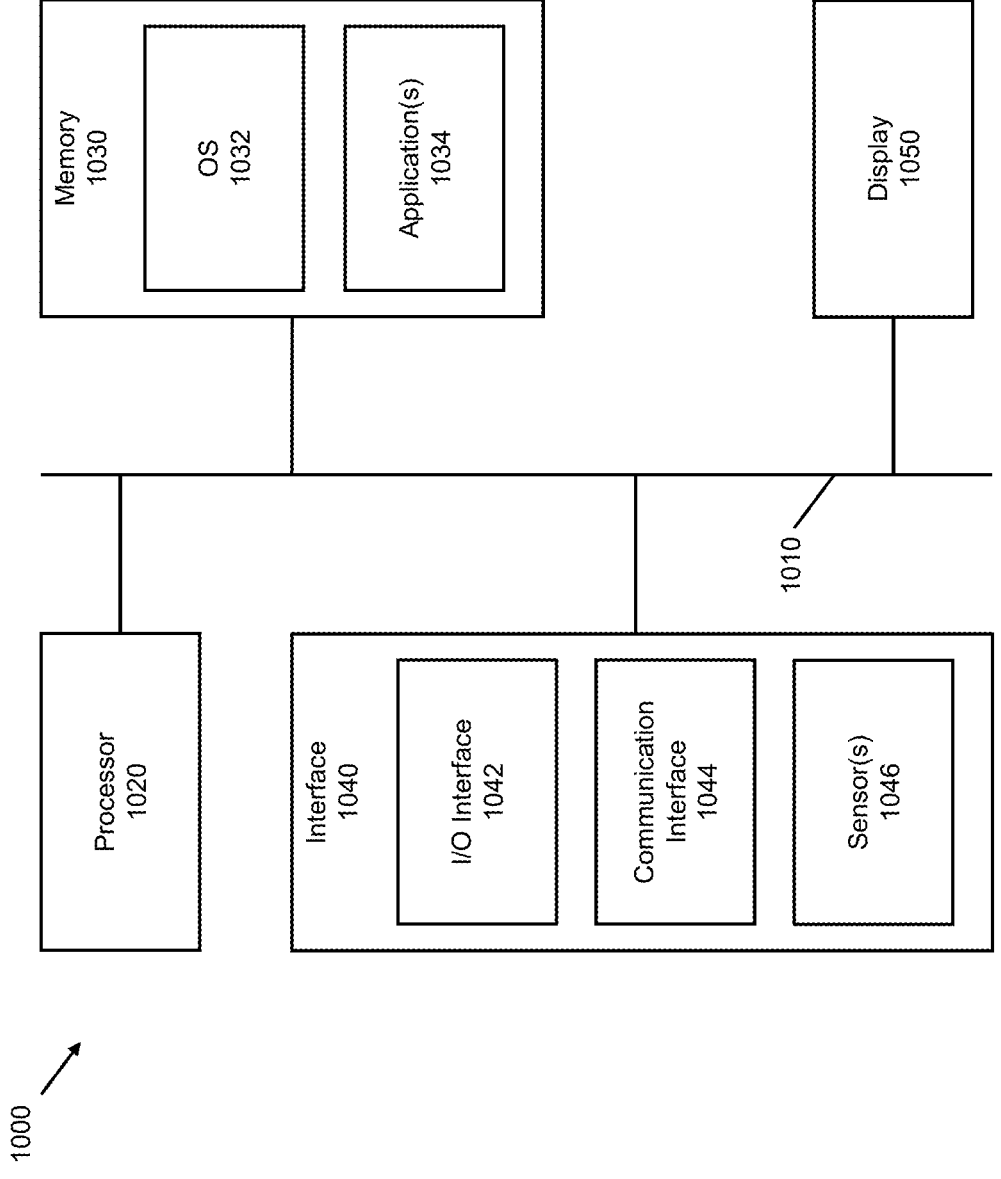
FIG. 12 is a diagram of components of one or more electronic devices of FIG. 11 according to embodiments of the present disclosure.

FIG. 12 is a diagram of components of one or more electronic devices of FIG. 11 according to an embodiment. An electronic device 1000 in FIG. 12 may correspond to the user device 110 and/or the server 120.

FIG. 12 is for illustration only, and other embodiments of the electronic device 1000 could be used without departing from the scope of this disclosure. For example, the electronic device 1000 may correspond to a client device or a server.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 obtains video frames and/or videos from the memory 1030 or the interface 1040 (e.g., a communication interface 1044 that receives videos or video frames from an external device), obtains a query from the interface 1040 (e.g., sensors 1046, such as a microphone, a keyboard, and a mouse, that receives a text input or a voice signal from a user), and performs operations 701-711, 901-

908, and 1001-1008 as illustrated in FIGS. 7-10 based on the videos, the video frames, and the query. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020. In particular, the memory 1030 may store the sampler model 110, the multi-modal models 120, the link files 211-213, and one or more videos.

The applications 1034 include the above-discussed embodiments. These functions can be performed by a single application or by multiple applications that each carry out one or more of these functions. For example, the applications 1034 may include an artificial intelligence (AI) model for performing operations 701-711, 901-908, and 1001-1008 as illustrated in FIGS. 7-10.

The display 1050 includes, for example, a liquid crystal display (LCD), a light emitting diode (LED) display, an organic light emitting diode (OLED) display, a quantum-dot light emitting diode (QLED) display, a microelectrome-chanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The communication interface 1044 may enable communication between the electronic device 1000 and other external devices, via a wired connection, a wireless connection, or a combination of wired and wireless connections. The communication interface 1044 may permit the electronic device 1000 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 1044 may receive videos and/or video frames from an external device, such as a server.

The sensor(s) 1046 of the interface 1040 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, and one or more buttons for touch input. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000. The sensor(s) 1046 may receive a text and/or a voice signal that contains one or more queries.

Figure 13:
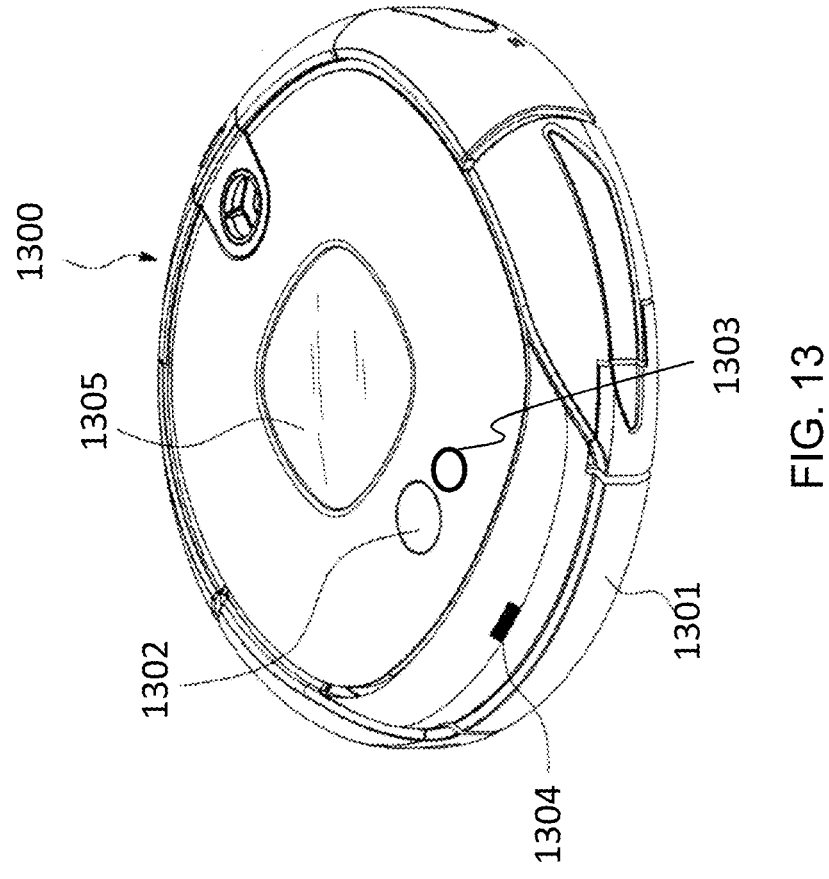
FIG. 13 is a diagram of a robot cleaner according to embodiments of the disclosure.

FIG. 13 is a diagram of a robot cleaner according to embodiments of the disclosure.

Referring to FIG. 13, a robot cleaner 1300 may include various sensors mounted thereon, to sense an obstacle. For example, the robot cleaner 1300 may include a proximity sensor 1301 and/or a vision sensor 1302. For example, when the robot cleaner 1300 travels in a random direction under the condition that there is no predetermined path along which the robot cleaner 1300 travels, that is, in a cleaning system having no map, the robot cleaner 1 may travel about a cleaning region and sense an obstacle, using the proximity sensor 1301. On the other hand, when the robot cleaner 1300 travels along a predetermined path, that is, in a cleaning system requiring a map, the vision sensor 1302 may be installed to receive vision information of the robot cleaner 1300, and thus to create a map. The vision sensor 62 may be implemented as a camera.

The robot cleaner 1300 may further include a microphone 1303 to receive a voice command from a user, a communication interface 1304 configured to communicate with another device, such as a user device (e.g., a smartphone) and/or a server, and a display 1305 configured to allow the user to input a command and to show visual information. The robot cleaner 1300 may further include the processor 1020 and the memory 1030 as illustrated in FIG. 12. The memory 1030 may include either one or both the sampler model 110 and the multimodal model 120.

According to embodiments of the disclosure, the robot cleaner 1300 may receive a user command via the microphone 1303 or the communication interface 1304. For example, the user command may request the robot cleaner 1300 to create a map of a certain area (e.g., a kitchen).

Upon receipt of the user command, the robot cleaner 1300 may travel in a random direction and may record a video via the vision sensor (e.g., a camera) 1302 while traveling the entire area where the robot cleaner is allowed to travel. The robot cleaner 130 may input a sequence of frames of the video to the sampler model 110 to obtain a set of selected frames from the input frames. The sampler model 110 may provide the selected frames to the multimodal model 120. When the multimodal model 120 is not stored in the memory 1030 of the robot cleaner 1300, but is stored in the server 1200, the robot cleaner 1300 may transmit the selected frames and the user command to the server 1200. Based on the selected frames, and the user command, the multimodal model 120 may identify a video that matches a text query (e.g., "create a map of a kitchen") included in the user command. When the multimodal model 120 is located in the server 1200, the server 1200 may transmit the identified video to the robot cleaner 1300. For example, the video may show a set of images of the kitchen among a plurality of images including other areas, such as a bedroom, a living room, and a bathroom. The robot cleaner 130 may display the identified matching video through the display 1305, or may transmit the identified matching video to a user device (e.g., a smartphone). When the sampler model 110 and the multimodal model 120 are both included in the robot cleaner 1300, the above-mentioned communications between the robot cleaner 1300 and the server 1200 may be omitted.

Figure 14:
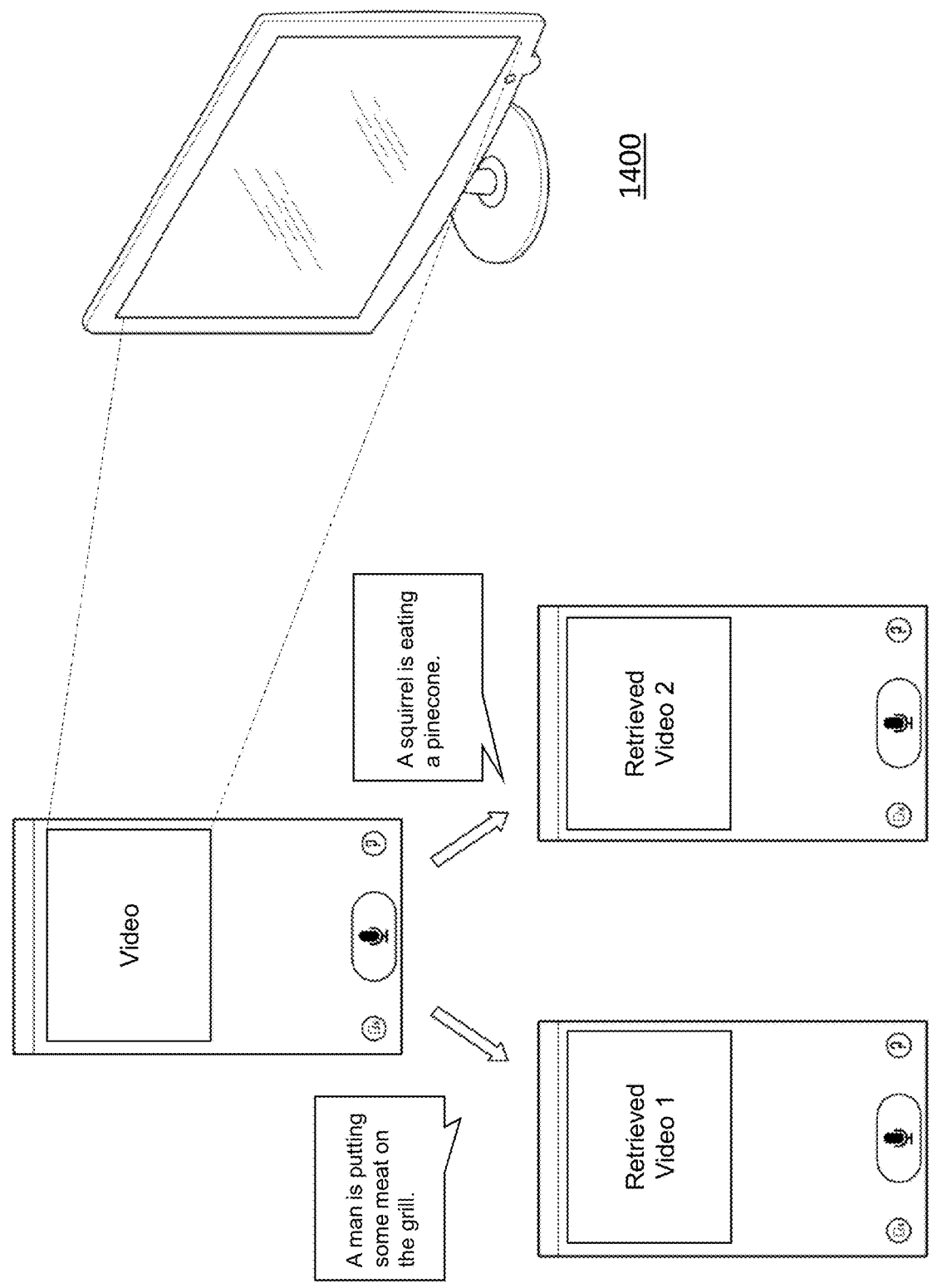
FIG. 14 illustrates a diagram of a smart TV according to embodiments of the disclosure.

FIG. 14 illustrates a diagram of a smart TV according to embodiments of the disclosure.

Referring to FIG. 14, a smart TV 1400 may include either one or both the sampler model 110 and the multimodal model 120. When the smart TV 1400 includes one of the sampler model 110 or the multimodal model 120, and the other one is included in the server 1200, the smart TV 1400 may communicate with the server 1200 to inter-operate the sampler model 110 or the multimodal model 120. For example, when the smart TV 1400 receives a first query stating "a man is putting some meat on the grill," the smart TV 1400 may retrieve a first video that matches the first query, using the sampler model 110 and the multimodal model 120. On the other hand, when the smart TV 1400 receives a second query stating "a squirrel is eating a pinecone," the smart TV 1400 may retrieve a second video that matches the second query, using the sampler model 110 and the multimodal model 120.

The sampling process and the multimodal process may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The forecasting method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 106.

The foregoing disclosure provides illustration and description, but is not intended to be exhaustive or to limit the implementation to the precise form disclosed. Modifications and variations are possible in light of the above disclosure or may be acquired from practice of the implementation.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the electronic device 1000.

A model related to the neural networks described above may be implemented via a software module. When the model is implemented via a software module (for example, a program module including instructions), the model may be stored in a computer-readable recording medium.

Also, the model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

Image processing with a related-art model for feature generation could cost almost 300 billion floating-point operations per second (FLOPs). On the other hand, a system according to example embodiments of the present disclosure may substantially reduce the computational overhead by as much as 43% while achieving better performance. These savings are especially valuable on resource-constrained devices such as mobile phones. Mobile phones have limited cycles and need to perform various maintenance activities during its background processing. Computational savings can help extend the phone battery life and alleviate heating issues. Alternatively, in a public cloud setting, using fewer cores to perform video feature generation translates to savings in monetary costs.

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device comprising:
at least one memory storing one or more instructions; and
at least one processor configured to execute the one or more instructions to:
    obtain a query from a user input;
    determine a computational resource of the electronic device;
    identify a sampler neural network corresponding to the computational resource of the electronic device, among a plurality of sampler neural networks;
    obtain a sequence of frames of one or more input videos;
    select frames from the sequence of frames of the one or more input videos, via the sampler neural network configured to extract features from the sequence of frames that are input to the sampler neural network, determine temporal dependencies between the extracted features, and determine an action of selecting or skipping for each of the sequence of frames; and
    identify a video that matches the query via a multimodal neural network configured to receive the selected frames and the query, and output the video that matches the query, among the one or more input videos,
    wherein the sampler neural network and the multimodal neural network are jointly trained based on an aggregated loss that combines an accuracy loss that represents an accuracy of determining the video that matches the query, and an efficiency loss that reflects a proportion of frames being passed to the multimodal neural network, and
    wherein the plurality of sampler neural networks are trained using different weights for combining the accuracy loss and the efficiency loss, the sampler neural network being trained using a weight for a combination of the accuracy loss and the efficiency loss that corresponds to the computational resource of the electronic device.

2. The electronic device of claim 1, wherein the multimodal neural network is stored in the electronic device or a server, and
wherein, when the multimodal neural network is stored in the server, the at least one processor is further configured to execute the one or more instructions to:
transmit the query and the selected frames to the server; and
identify the video that matches the query based on a response received from the server.

3. The electronic device of claim 1, further comprising:
a communication interface configured to receive the user input including the query from an external device, and transmit the video that matches the query to the external device; and
a camera, wherein the at least one processor is further configured to execute the one or more instructions to obtain the one or more input videos via the communication interface or the camera.

4. The electronic device of claim 1, wherein the at least one processor is further configured to execute the one or more instructions to:
obtain the sequence of frames by sampling the one or more input videos at an interval corresponding to the computational resource of the electronic device; and
input the sequence of frames to the sampler neural network to determine the action of selecting or skipping for each of the sequence of frames.

5. The electronic device of claim 1, wherein the sampler neural network is configured to stop providing the selected frames to the multimodal neural network and start providing the selected frames to another multimodal neural network, when the multimodal neural network stops operating and the other multimodal neural network starts running to perform a multimodal task.

6. The electronic device of claim 1, wherein the sampler neural network is further configured to:
determine the temporal dependencies based on hidden state values that are obtained from the extracted features;
determine the action of selecting or skipping for each of the sequence of frames by inputting the hidden state values to fully connected layers; and
determine the video that matches the query, based on similarity scores between the selected frames and the query.

7. The electronic device of claim 1, wherein the sampler neural network comprises:
a two-dimensional (2D) convolutional neural network (CNN) configured to extract the features; and
a long short-term memory (LSTM) configured to identify the temporal dependencies between the extracted features.

8. The electronic device of claim 1, wherein the sampler neural network comprises:
a two-dimensional (2D) convolutional neural network (CNN) configured to extract the features; and
a transformer configured to process the sequence of frames in parallel, and identify the temporal dependencies between the extracted features through a self-attention mechanism.

9. The electronic device of claim 1, wherein the sampler neural network is further configured to:
obtain continuous approximation vectors that approximate a distribution of selecting or skipping for each of the frames, as back-propagation data for the sampler neural network and the multimodal neural network.

10. The electronic device of claim 1, wherein the multimodal neural network is further configured to:
extract the features from the selected frames using a three-dimensional (3D) convolutional neural network (CNN); and
process the features extracted by the 3D CNN via a projection layer and a pooling layer.

11. A method of processing image data, the method comprising:
obtaining a query from a user input;
determining a computational resource of an electronic device;
identifying a sampler neural network corresponding to the computational resource of the electronic device, among a plurality of sampler neural networks;

obtaining a sequence of frames of one or more input videos;

selecting frames from the sequence of frames of the one or more input videos, via the sampler neural network configured to extract features from the sequence of frames that are input to the sampler neural network, determine temporal dependencies between the extracted features, and determine an action of selecting or skipping for each of the sequence of frames; and identifying a video that matches the query via a multimodal neural network configured to receive the selected frames and the query, and output the video that matches the query, among the one or more input videos, wherein the sampler neural network and the multimodal neural network are jointly trained based on an aggregated loss that combines an accuracy loss that represents an accuracy of determining the video that matches the query, and an efficiency loss that reflects a proportion of frames being passed to the multimodal neural network, and wherein the plurality of sampler neural networks are trained using different weights for combining the accuracy loss and the efficiency loss, the sampler neural network being trained using a weight for a combination of the accuracy loss and the efficiency loss that corresponds to the computational resource of the electronic device.

12. The method of claim 11, further comprising:

obtaining the sequence of frames by sampling the one or more input videos at an interval corresponding to the computational resource of the electronic device; and inputting the sequence of frames to the sampler neural network to determine the action of selecting or skipping for each of the sequence of frames.

13. The method of claim 11, further comprising:

determining the temporal dependencies based on hidden state values that are obtained from the extracted features;

determining the action of selecting or skipping for each of the sequence of frames by inputting the hidden state values to fully connected layers; and determining the video that matches the query, based on similarity scores between the selected frames and the query.

14. The method of claim 11, further comprising:

extracting the features via a two-dimensional (2D) convolutional neural network (CNN) included in the sampler neural network; and identifying the temporal dependencies between the extracted features via a long short-term memory (LSTM) included in the sampler neural network.

15. The method of claim 11, further comprising:

extracting the features via a two-dimensional (2D) convolutional neural network (CNN) included in the sampler neural network; and identifying the temporal dependencies between the extracted features via a transformer configured to process the sequence of frames in parallel, and identify the temporal dependencies between the extracted features through a self-attention mechanism.

16. The method of claim 11, further comprising:

obtaining continuous approximation vectors that approximate a distribution of selecting or skipping for each of the frames, as back-propagation data for the sampler neural network and the multimodal neural network.

17. The method of claim 11, further comprising:

extracting the features from the selected frames using a three-dimensional (3D) convolutional neural network (CNN); and processing the features extracted by the 3D CNN via a projection layer and a pooling layer.

18. A non-transitory computer readable storage medium which is configured to, when executed by at least one processor, perform a method of processing image data, the method comprising:

obtaining a query from a user input;

determining a computational resource of an electronic device;

identifying a sampler neural network corresponding to the computational resource of the electronic device, among a plurality of sampler neural networks;

obtaining a sequence of frames of one or more input videos;

selecting frames from the sequence of frames of the one or more input videos, via the sampler neural network configured to extract features from the sequence of frames that are input to the sampler neural network, determine temporal dependencies between the extracted features, and determine an action of selecting or skipping for each of the sequence of frames; and identifying a video that matches the query via a multimodal neural network configured to receive the selected frames and the query, and output the video that matches the query, among the one or more input videos, wherein the sampler neural network and the multimodal neural network are jointly trained based on an aggregated loss that combines an accuracy loss that represents an accuracy of determining the video that matches the query, and an efficiency loss that reflects a proportion of frames being passed to the multimodal neural network, and wherein the plurality of sampler neural networks are trained using different weights for combining the accuracy loss and the efficiency loss, the sampler neural network being trained using a weight for a combination of the accuracy loss and the efficiency loss that corresponds to the computational resource of the electronic device.

* * * * *